US011176139B2

(12) United States Patent
Li et al.

(10) Patent No.: US 11,176,139 B2
(45) Date of Patent: Nov. 16, 2021

(54) SYSTEMS AND METHODS FOR ACCELERATED CONTEXTUAL DELIVERY OF DATA

(71) Applicant: MicroStrategy Incorporated, Tysons Corner, VA (US)

(72) Inventors: Yan Li, Fairfax, VA (US); Don Punnoose, Aldie, VA (US); Hui Yuan, Fairfax, VA (US); Jinliang Zeng, Vienna, VA (US); Liang Chen, Fairfax, VA (US)

(73) Assignee: MicroStrategy Incorporated, Tysons Corner, VA (US)

( * ) Notice: Subject to any disclaimer, the term of this patent is extended or adjusted under 35 U.S.C. 154(b) by 254 days.

(21) Appl. No.: 16/688,065

(22) Filed: Nov. 19, 2019

(65) Prior Publication Data

US 2021/0149906 A1 May 20, 2021

(51) Int. Cl.
| | |
|---|---|
| *G06F 16/24* | (2019.01) |
| *G06F 16/2455* | (2019.01) |
| *G06F 16/23* | (2019.01) |
| *G06F 16/25* | (2019.01) |
| *G06F 16/248* | (2019.01) |
| *G06F 16/903* | (2019.01) |

(52) U.S. Cl.
CPC .... *G06F 16/24552* (2019.01); *G06F 16/2379* (2019.01); *G06F 16/248* (2019.01); *G06F 16/252* (2019.01); *G06F 16/90348* (2019.01); *G06F 2221/2143* (2013.01)

(58) Field of Classification Search
CPC ........... G06F 16/172; G06F 16/24–248; G06F 16/3338; G06F 16/2379; G06F 16/252; G06F 16/90348
See application file for complete search history.

(56) References Cited

U.S. PATENT DOCUMENTS

| 10,915,455 B2* | 2/2021 | Jayaraman .......... G06F 12/0837 |
| 2011/0196851 A1* | 8/2011 | Vadlamani .......... G06F 16/9535 707/706 |
| 2012/0203753 A1* | 8/2012 | Biran ................ G06F 16/90344 707/706 |
| 2012/0278305 A1* | 11/2012 | Wei ................... G06F 16/24524 707/713 |

(Continued)

*Primary Examiner* — Robert W Beausoliel, Jr.
*Assistant Examiner* — Nirav K Khakhar
(74) *Attorney, Agent, or Firm* — Bookoff McAndrews, PLLC

(57) ABSTRACT

Methods, systems, and apparatus, including computer programs stored on computer-readable media, for accelerated contextual delivery of content. In some implementations, a data cache associated with the application may be identified, the data cache comprising a plurality of data chunks. At least a portion of the plurality of data chunks may be received. Upon completed receipt of a first data chunk, the text associated with the user interface may be searched for at least one term associated with the first data chunk to identify one or more matched terms. Additional data may be determined associated with the one or more matched terms, and the text associated with the user interface may be updated with at least one annotation corresponding to the one or more matched terms, the at least one annotation corresponding to the additional data.

20 Claims, 6 Drawing Sheets

(56) References Cited

U.S. PATENT DOCUMENTS

2015/0213074 A1* 7/2015 Varakin ............ G06F 16/24532
 707/741
2021/0141794 A1* 5/2021 Picorel ............. G06F 16/24537

* cited by examiner

SYSTEMS AND METHODS FOR ACCELERATED CONTEXTUAL DELIVERY OF DATA

TECHNICAL FIELD

The present disclosure relates to systems and methods for accelerated inline delivery of database content.

INTRODUCTION

Websites and network-connected applications are capable of accelerating contextually relevant information acquisition as compared with prior paper-based catalogues. However, problems arise in processing copious amounts of data and in presenting contextually relevant information expediently.

SUMMARY

In one general aspect, a method performed by one or more computers includes: receiving text associated with a user interface of an application at an electronic device. A data cache associated with the application may be identified, the data cache comprising a plurality of data chunks, wherein the plurality of data chunks includes a first data chunk and a second data chunk, and wherein each data chunk of the plurality of data chunks comprises at least one term of a plurality of terms. At least a portion of the plurality of data chunks may be received, wherein the at least a portion of the plurality of data chunks received includes the first data chunk and the second data chunk. Upon completed receipt of the first data chunk of the plurality of data chunks, the text associated with the user interface may be searched for at least one term associated with the first data chunk to identify one or more matched terms. Additional data may be determined associated with the one or more matched terms, and the text associated with the user interface may be updated with at least one annotation corresponding to the one or more matched terms, the at least one annotation corresponding to the additional data.

In one general aspect, a system for accelerating contextual delivery of data may comprise one or more processors and one or more machine-readable media storing software including instructions that, when executed by the one or more processors, cause the system to perform operations comprising: receiving text associated with a user interface of an application at an electronic device. A data cache associated with the application may be identified, the data cache comprising a plurality of data chunks, wherein the plurality of data chunks includes a first data chunk and a second data chunk, and wherein each data chunk of the plurality of data chunks comprises at least one term of a plurality of terms. At least a portion of the plurality of data chunks may be received, wherein the at least a portion of the plurality of data chunks received includes the first data chunk and the second data chunk. Upon completed receipt of the first data chunk of the plurality of data chunks, the text associated with the user interface may be searched for at least one term associated with the first data chunk to identify one or more matched terms. Additional data may be determined associated with the one or more matched terms, and the text associated with the user interface may be updated with at least one annotation corresponding to the one or more matched terms, the at least one annotation corresponding to the additional data.

In one general aspect, a non-transitory machine-readable media may store instructions that, when executed by one or more processors, cause the performance of operations for accelerating contextual delivery of data comprising: receiving text associated with a user interface of an application at an electronic device. A data cache associated with the application may be identified, the data cache comprising a plurality of data chunks, wherein the plurality of data chunks includes a first data chunk and a second data chunk, and wherein each data chunk of the plurality of data chunks comprises at least one term of a plurality of terms. At least a portion of the plurality of data chunks may be received, wherein the at least a portion of the plurality of data chunks received includes the first data chunk and the second data chunk. Upon completed receipt of the first data chunk of the plurality of data chunks, the text associated with the user interface may be searched for at least one term associated with the first data chunk to identify one or more matched terms. Additional data may be determined associated with the one or more matched terms, and the text associated with the user interface may be updated with at least one annotation corresponding to the one or more matched terms, the at least one annotation corresponding to the additional data.

Other embodiments of these and other aspects include systems, devices, and computer-readable media configured to cause the actions of the methods to be performed.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

Like reference numbers and designations in the various drawings indicate like elements.

DETAILED DESCRIPTION

Figure 1:
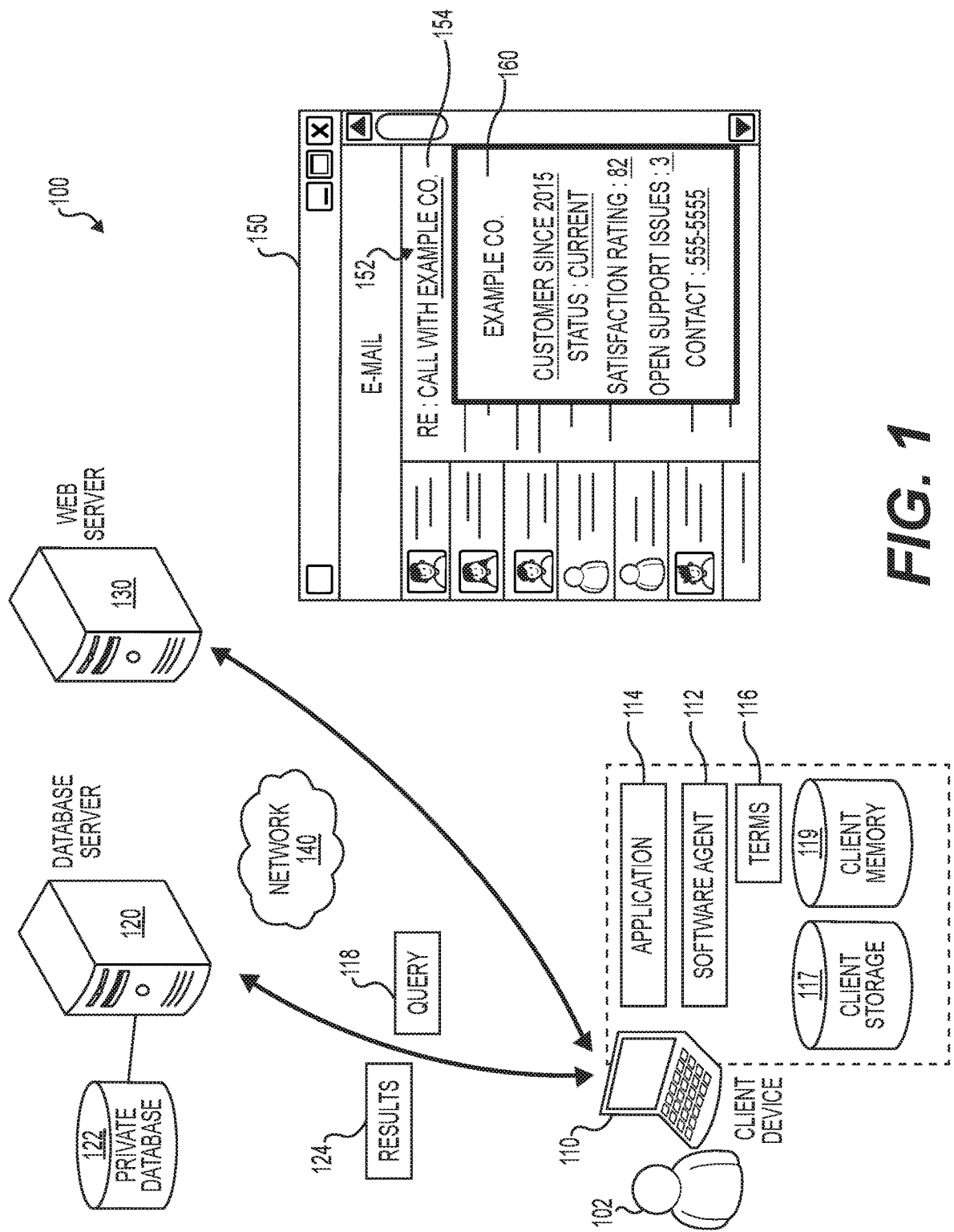
FIG. 1 is a diagram of an example of a system for inline delivery of database content.

In the discussion that follows, relative terms such as "about," "substantially," "approximately," etc. are used to indicate a possible variation of ±10% in a stated numeric value. It should be noted that the description set forth herein is merely illustrative in nature and is not intended to limit the embodiments of the subject matter, or the application and uses of such embodiments. Any implementation described herein as exemplary is not to be construed as preferred or advantageous over other implementations. Rather, as alluded to above, the term "exemplary" is used in the sense of example or "illustrative," rather than "ideal." The terms "comprise," "include," "have," "with," and any variations thereof are used synonymously to denote or describe a non-exclusive inclusion. As such, a process, method, article, or apparatus that uses such terms does not include only those steps, structure or elements but may include other steps, structures or elements not expressly listed or inherent to such process, method, article, or apparatus. Further, the terms "first," "second," and the like, herein do not denote any order, quantity, or importance, but rather are used to distinguish one element from another. Similarly, terms of relative orientation, such as "front side, "top side," "back side," "bottom side," etc. are referenced relative to the described figures. Moreover, the terms "a" and "an" herein do not denote a limitation of quantity, but rather denote the presence of at least one of the referenced item.

In some implementations, a computing system may identify keywords in a user interface and dynamically retrieve and present relevant information inline with the user interface. For example, a client device may run a software agent, such as a web browser extension, that monitors a user interface for instances of certain keywords.

When the keywords are present, the software agent may annotate the keywords and makes them interactive in the user interface. If a user interacts with a keyword, for example, by placing a cursor over the keyword, the software agent may cause an information card or information panel to be displayed, e.g., overlaying a portion of the original user interface or otherwise inserted into the user interface. Information cards may be displayed in response to a user search, and may be used in conjunction with a calendar application, where notifications to the user may be generated if keywords match contents of information cards. In this manner, the user may easily access information that is contextually relevant to the user interface, without the need to open a new application or switch between interfaces. This technique also provides numerous other advantages, discussed below, such as allowing content to be efficiently integrated with third-party user interfaces that the content provider does not control.

The system may allow for significant customizability. The keywords monitored by the software agent may be specific to a user or the user's organization. For example, when the user is an employee of a company, the keywords of interest may be extracted from a private database for the company. The keywords may additionally or alternatively be selected or filtered to terms applicable to the specific user, e.g., terms relevant to the user's role in the company. When one of the keywords is determined to be present in the user interface, the software agent may communicate with a server system to obtain information related to the keyword. This information may include data retrieved from a private database that has information specific to an organization associated with the user. For example, if the keyword refers to a customer of a user's company, status information, statistics, contact information, and other information about the customer's account with the company can be provided from the company's private database.

The type of information provided, as well as the values shown for those information types, may be customized for the user and organization. For example, a sales representative and a product engineer at the same company may be shown different types of information for the same keyword, due to their different roles. Similarly, two users in a company with the same role might be shown different information for the same keyword, due to the users having different types of previous interactions with the system. In general, the system can use machine learning techniques to predictively select which information to show to a particular user at a particular time for a given keyword, and how to organize the information.

In many conventional systems, user interfaces have a predetermined structure or layout designed to accommodate the content displayed. To add a new frame or region of the interface, the structure of each user interface to be updated usually must be changed one by one. For example, to provide embedded content in a web page or web application, the user interface is often designed to include an iFrame or other element for the embedded content. Native applications also generally have pre-defined user interface layouts. This often makes it difficult to add or alter embedded content regions in user interfaces because the source code, HTML code, or other data defining each user interface needs to be individually changed. For example, it may be desirable to provide a new embedded content region in each of many different pages of a web site or web application, but doing so may require changes to each of the pages individually.

Embedding content is also challenging because the party desiring to embed the content may not control or have the ability to change the underlying user interface.

The challenge of embedding content in user interfaces is also significant since the embedded content may be needed only selectively. For example, it may be desirable to embed content on some pages but not others. Similarly, the embedded content may only be applicable for a page at certain times and not others. The need for the embedded content may vary over time, and may be dependent on factors such as the context provided by other content in the page, which may also vary over time. As a result of these factors and others, simply adjusting a general template for many pages cannot perform the fine-grained integration of embedded content, since the decisions whether to embed content and what content to embed is often a page-specific decision that changes over time.

A further challenge arises since embedded content may be assembled from a plurality of data sources, including third party data sources, which may make the process slow and degrade the user experience.

The techniques discussed in this document address these challenges by allowing content to be presented inline with web pages and applications that the content provider does not control and cannot modify. Similarly, the system can be configured to provide content inline with other content that has not been created yet, such as web pages or web applications that are not yet available.

The techniques in this document also provide an efficient way for users to access information, such as analytics data, in a user interface. By allowing a user to call up an information card within an existing user interface, the user no longer needs to switch applications and lose the context of the applications involved in the user's current task.

Traditionally, if a user is performing a task with an application and desires to look up information from an analytics platform or other database-backed platform, the user generally needs to switch applications or windows, log in, submit a query for the information desired, then wait for results to be returned. The delays, multiple steps required, and overall inconvenience often discourage users from looking up needed information.

By contrast, the techniques in the present application do not require the user to switch applications or interfaces, and contextually-relevant information is provided in the interface where the user needs the information. This provides needed information to just the right user, at the right time, and the user interface where the information is needed. Delays are minimal because the client device can request and receive contents of the information cards before the user indicates that the information should be displayed. The software agent on a client device can evaluate contents of the user interface, generate a query for a server system, and receive and format results for display so the information cards for each of multiple different terms are available for display before the user indicates the terms of interest. Also, the user can call up the information with a single action on the existing interface, such as a mouseover, click, or tap on an annotated term in the user interface.

Limited user interface space might be used since the information card can be provided in the same window or area of the application the user is already using, with no need to switch between applications. Also, the information card may be displayed and removed dynamically, so it is shown only when the user requests it. Unlike interfaces that include a dedicated, persistent area for content that may not be needed at most times, the present technique frees up more of the interface for use by an application.

The techniques discussed below also provide an efficient way to publish customized or private database content to users. The keywords or terms of interest to each organization can be set based on the private database contents for the organization. For example, each organization can have its own set of customers, employees, suppliers, product names, and so on reflected in its private database. Based on the database contents, terms have a semantic meaning that is specific to that organization, which the system uses to tailor the display of information for members of the organization.

In some implementations, the system provides an interface for an administrator to easily adjust the sets of terms that the system will highlight and make interactive for members of the organization by updating the database or identifying certain portions of a dataset. For example, an administrator can identify columns of a private database corresponding to employee names, customer names, and product names. The system extracts the contents of these columns and designates them as key terms for the organization. The current set of these terms can be downloaded to client devices of members of the organization when they authenticate to the software agents on the client devices, so each time the user authenticates the set of terms is refreshed at the client device based on the current state of the database. The terms may be organized into related categories. Each category may be known as an information card set. For example, terms corresponding to company names may be categorized under a company information card set. Terms corresponding to employee names may be categorized under an employee information card set. The information displayed in the information cards is also generated using the current records of the database. Thus, by designating certain records or fields from an organization's database, an administrator can adjust or update the set of content published to some or all members of the organization, which will be made available through many user interfaces (e.g., presented in-line with any web page or web application).

When a client device indicates that one of the key terms for the organization is present, the server system can access the underlying database record(s) corresponding to the term to generate relevant information to provide. The semantic meaning of the term that is applicable for the user and organization may be used to provide customized results. For example, different types of information may be provided based on the classification of the term, e.g., whether a term is the name of an employee, customer, or product. Different semantic classifications can have different data types or sets of information to be provided. Even for a particular classification, of the many potential types of data that may be provided, a subset can be selected based on analysis of the database contents (e.g., to identify trends or items that are popular, recent, or unusual according to various thresholds), relevance to the user (e.g., applicability to the user's historical behavior or role in the organization), and/or context (e.g., other keywords in the user interface, which may indicate geographical location, time, individuals, or other information relevant to the user's current task). In this process, the organization's security policies are preserved. If a user does not have authorization to access a field or record from the database, the server system will enforce access restrictions and might not provide the information. Consequently, different users, even within the same organization, may be presented different sets of information for the same term, due to the users' differing roles, interaction histories, access authorizations, and other factors.

FIG. 1 is a diagram of an example of a system 100 for inline delivery of database content. The system 100 includes one or more client devices 110, one or more servers 120, one or more web servers 130. The client device 110, server 120, and web server 130 may communicate across one or more networks 140. The server 120 may have access to one or more private databases 122 for an organization. The server 120 may be implemented using multiple computers that cooperate to perform the functions discussed below, and which may be located remotely from each other. The client device 110 may include an application 114 as well as a software agent 112 that enables the client device 110 to dynamically generate and display contextually-relevant information cards 160 displayed inline with the application 114. As discussed below, the software agent 112 may allow the client device 110 to obtain and provide information from the private database 122 with the application 114 and web page from the web server 130, even though the application 114 and web page may be controlled by third parties.

The client device 110 is associated with a user 102, who is a member of an organization, e.g., an employee of a company. The private database 122 represents database records stored by or for the organization. The records might not be publicly available and may be subject to data access restrictions, such as requirements that users be issued credentials from the organization that grant authorization to access the records. Different users may be granted different levels of authorization, and the server 120 may enforce access restrictions so that each user is only allowed to access the subsets of information the user is authorized to access. Techniques used herein may also accumulate data from publicly available databases for displaying information cards 160.

Some techniques may incorporate analytics content into the body of a document, using an iFrame or similar technique. This approach can be inefficient, because each application or web page generally needs to be updated individually. Further, this type of embedding may not be possible when the content provider does not control the target application or web page for content to be embedded into. For example, an organization may not be able to change the standard e-mail application interface that a third party provides.

In the system 100, instead of incorporating additional content into the source of a document or application, information may be instead added, just in time, through the software agent 112, for example, a browser extension for a web browser, a subroutine of application 114, etc. This provides the flexibility for the system to selectively provide dynamically changing content from the private database for any interface shown on the application 114, e.g., any web application or web page displayed by a web browser, any user interface 150 displayed on a display of the client device 110, etc.

In the example of FIG. 1, the client device 110 communicates with the web server 130 to obtain and display a page of a web site or web application in the application 114. The client device 110 generates a user interface 150 for the application 114. Concurrently, the software agent 112 runs on the client device 110 and receives, from the application 114, the text content of the rendered page, e.g., user interface 150.

The software agent 112 may require the user 102 to authenticate and thus prove authorization to receive content from the private database 122. The authentication of the user 102 can also indicate to the software agent 112 and/or server 120 the role of the user in the organization (e.g., software engineer, marketing technician, financial analyst, and so on) and the specific level of access authorization that has been, or will be, granted to the user 102 by the organization.

With the user logged in, the software agent 112 may access a set of terms 116, e.g., words and/or phrases, that are relevant to the user 102 and the organization. The set of terms may be stored at the client device 110. Terms may be stored in client storage 117, which may comprise non-volatile storage, and/or client memory 119, which may comprise volatile storage, where the client memory 119 may provide faster data access speeds than the client storage 117. In some implementations, the set of terms 116 is requested and received from the server 120 each time the user 102 authenticates. The set of terms can represent values from certain fields of the private database 122, for example, values representing names of customers of the company of the user 102.

The software agent 112 may compare the terms 116 with the text of the user interface 150 to identify matching terms. When the software agent 112 identifies one or more matches, it may generate a query 118 that indicates the matches and sends the query 118 to the server 120. In some implementations, the software agent 112 may also examine the text of the user interface 150 to identify and include in the query 118 other contextual factors that may be of interest (which may be different from the terms 116 of interest), such as terms indicating a time or a geographical location indicated in the user interface 150, or a task of the user 102 that may be indicated in the user interface 150. Various words and phrases indicating an overall subject or topic of the user interface 150 may also be extracted and provided in the query 118.

The server 120 may process the query 118 and generate results 124 using the contents of the private database 122. These results 124 may indicate, for each identified matching term, various indicators (e.g., attributes, statistics, visualizations, text, or other content) relevant to the term. In some instances, the indicators may represent key performance indicators for an entity referred to by an identified term with respect to the specific organization of the user 102. For example, when the term refers to a customer of a company of the user 102, one of the indicators may specify a product of the company that was purchased by the customer, current or forecasted sales of the company to the customer, etc.

The client device 110 may receive the results 124 from the server 120. The software agent 112 may annotate instances of the identified matching terms in the user interface and prepare the results 124 for display. For example, to annotate the matching terms, the software agent 112 may instruct the application 114 to highlight the term or otherwise change the formatting of the term (e.g., color, font, size, bold, italics, underlining, etc.) in the user interface 150. In some implementations, the results 124 are not immediately displayed. Rather, the software agent 112 may cause the matching terms to become interactive, so that interaction of the user with a term triggers display of an information card 160 for that term. In this manner, when a user indicates interest in one of the terms, e.g., by placing a mouse cursor over the term, the software agent 112 may be notified of the interaction and causes an information card with the indicators relevant to the term to be displayed. The information card 160 may be displayed overlaying a portion of the original user interface 150, for example, as a pop-up card near the instance of the term that the user interacted with. The software agent 112 may also detect when the user 102 is no longer interested in the information card and automatically remove (e.g., closes or hides) the information card in response. For example, when the user moves the cursor away from the interactive term and away from the information card (or taps or clicks outside the interactive term and information card), the software agent 112 may hide or remove the information card.

Matching terms may also be listed elsewhere on the user interface. For example, in FIG. 2C, matching terms 276 and 279 may be listed, according to category, in a side bar 273. When the user clicks, hovers, or otherwise indicates interest in matching terms 276 or 279, a relevant information card 160 may be displayed.

If the application 114 is a calendar or integrates a calendar, if terms in the calendar entries match information cards, information cards may be displayed over the calendar user interface. The software agent 112 may scan calendar entries at predetermined time intervals, and may automatically pop-up a local notification if the calendar content matches any information cards.

In FIG. 1, the software agent 112 has determined that the user interface 150 includes a term 152 "Example Co.," which is one of the terms 116 relevant to the organization of the user 102. The software agent 112 has received results 124 that indicate indicators for this term 152, which may represent a customer of the organization of the user 102. In response to identifying the matching term 152, and in some instances also receiving results 124 from the server 120 for the matching term 152, the software agent 112 may make the term 152 interactive and causes the term 152 to be annotated, in this case, displayed bold, underlined, and in italics. Initially, the software agent 112 might not cause any of the indicators for the term 152 to be displayed. However, when the user moves the cursor 154 over, or otherwise selects, the term 152, the software agent 112 detects the interaction and displays an information card 160 showing various indicators provided by the server 120 in the results 124. When the user 102 is done reviewing the information card 160, the user 102 may move the cursor away or click away from the term 152 and information card 160, and the software agent 112 may automatically hide or remove the information card 160 until the user 102 again interacts with the term 152.

The software agent 112 may receive and examine the content of the user interface 150 of the application 114 on a recurring or ongoing basis. For example, as the user 102 navigates to a new web page or a new view of a web or native "heavy" application, the software agent 112 examines the updated content of the user interface 150. The software agent 112 may determine matches in the updated interface, and request/obtain new results for the updated interface, and may cause new sets of terms to be annotated and made interactive, allowing the user 102 to access information cards for key terms for whatever interface content may be provided in the application 114. The software agent 112 may receive and analyze user interface content in substantially real time. For example, if the user 102 composes an e-mail message, the software agent may detect matching terms in text that the user types, in some instances while the user is still typing, and annotate matching terms in this content.

The system may provide very low latency for users to receive information regarding key terms in a user interface. Because the software agent 112 may identify terms and obtain terms automatically and in the background, in many instances the information needed for an information card 160 may be already present at the client device 110 before the term is annotated. Consequently, when the user interacts with an annotated term, the corresponding information card 160 can be displayed very quickly, often within a second or less. This provides users a very fast response while also allowing access to the information from the private database 122 without having to leave the user interface 150 of the application 114.

Figure 2A:
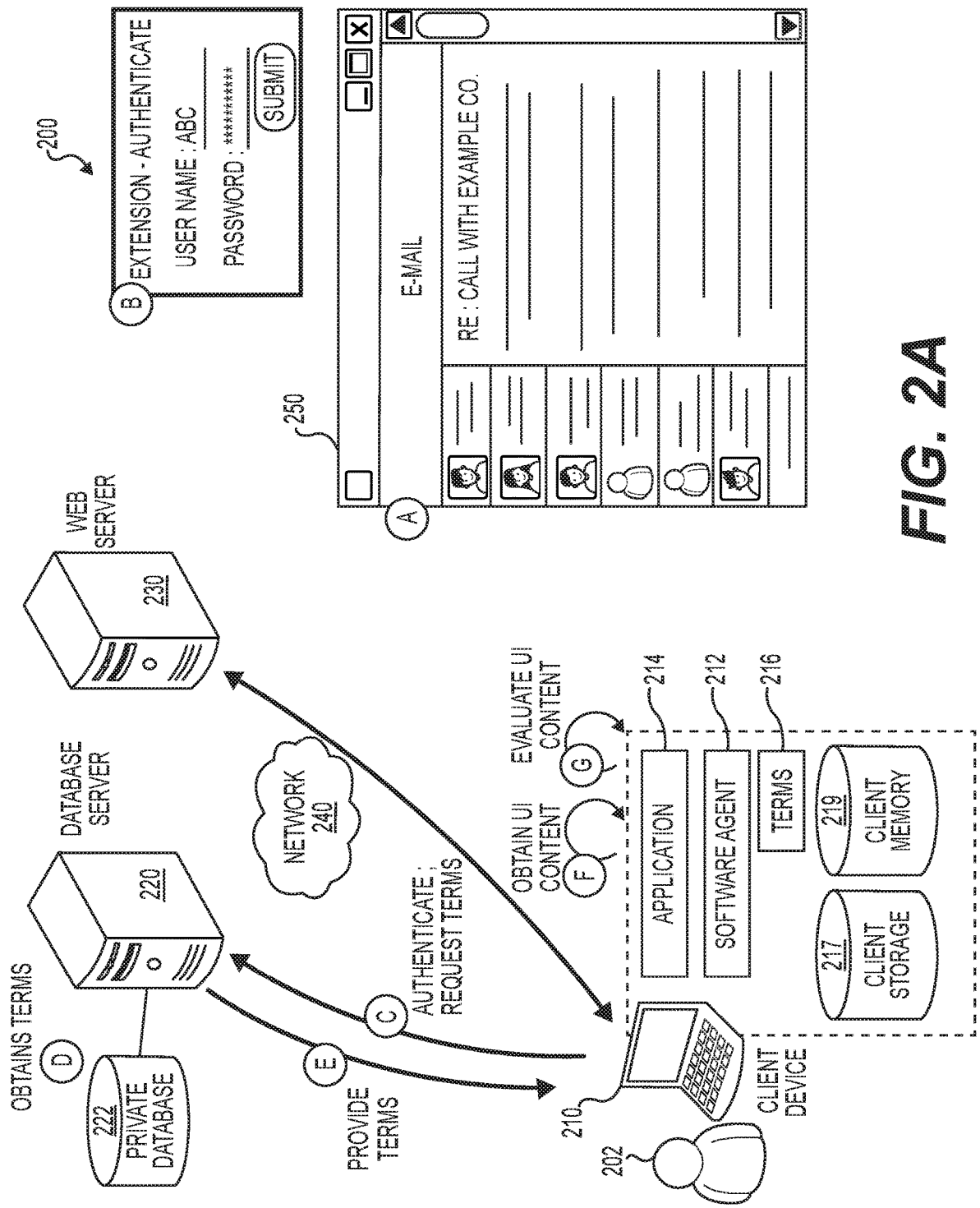
FIGS. 2A-2C are diagrams illustrating another example of a system for inline delivery of database content.
Figure 2B:
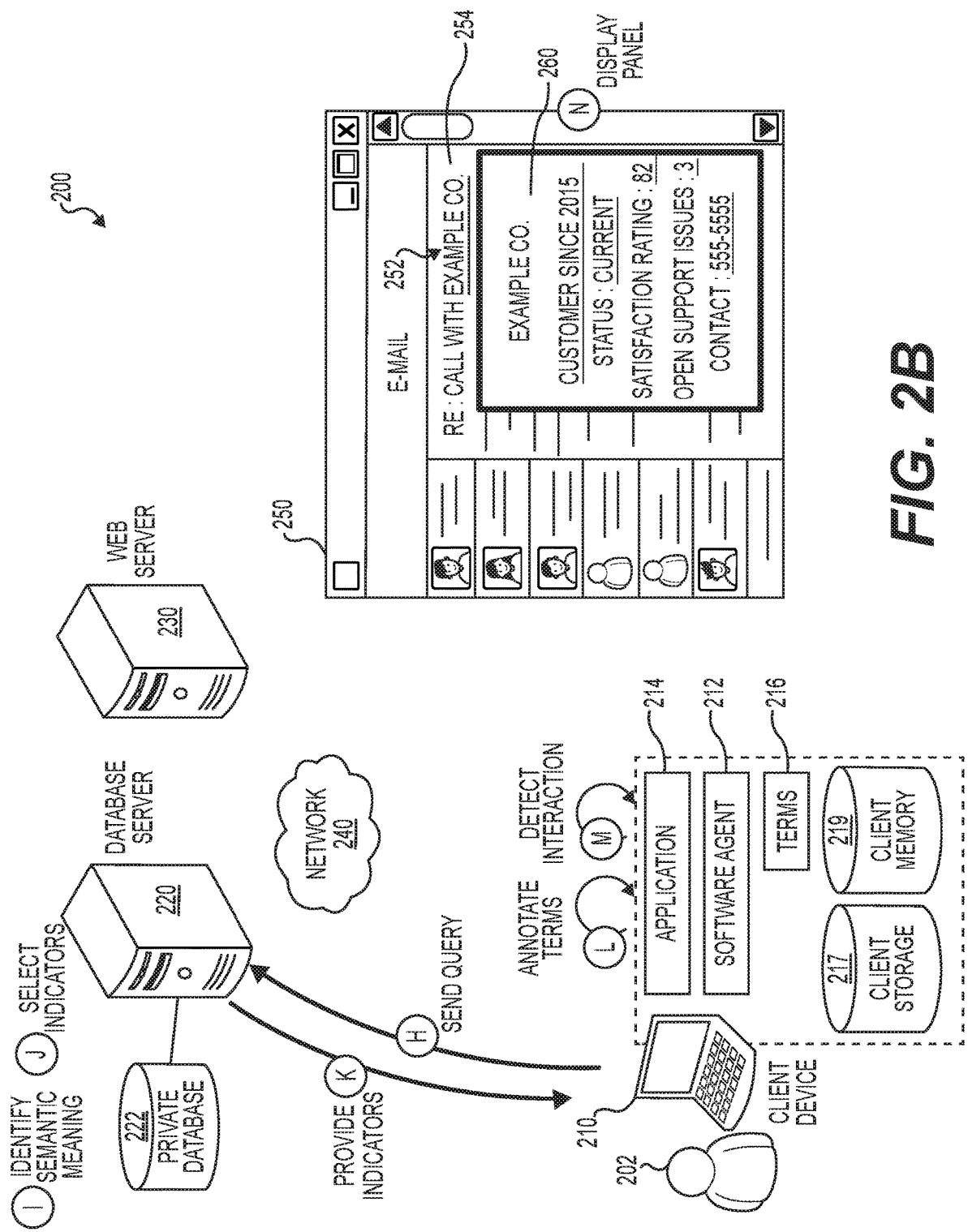
Figure 2C:

FIGS. 2A-2C are diagrams illustrating another example of a system 200 for inline delivery of database content. FIGS. 2A-2C illustrate various operations of the system 100 in greater detail. FIGS. 2A-2C illustrate various operations and flows of data represented as stages (A)-(N), which can be performed in the order shown or in a different order.

The system 200 may include one or more client devices 210, one or more servers 220, and/or one or more web server 230. These devices and servers may communicate across one or more networks 240. The server 220 may have access to a private database 222 for an organization. The server 220 may be implemented using multiple computers that cooperate to perform the functions discussed below, and which may be located remotely from each other. The client device 210 may include an application 214 as well as a software agent 212 that enables the client device 210 to dynamically generate and display contextually-relevant information cards displayed inline with the application 214. As discussed below, the software agent 212 allows the client device 210 to obtain and provide information from the private database 222 with the application 214 and web page from the web server 230, even though the application 214 and web page may be controlled by third parties.

In stage (A), the client device 210 may obtain and display content from the web server 230 in the user interface 250. Alternatively, the client device 210 may simply display the user interface of a native application, for example, application 270, as shown in FIG. 2C.

In stage (B), the user 202 may authenticate the software agent 212, e.g., a web browser extension or add-on for another type of application 114. For example, the software agent 212 may comprise an add-on or native component 273 for an application 270 such as an Outlook e-mail client, as shown in FIG. 3C. The software agent 212 may prompt the user 202 to log in, or the user may click an icon for the software agent 212 to initiate log in. The user can enter a username and password, or alternatively authenticate in another form, e.g., through biometric data entry, entry of a PIN code, etc.

In stage (C), the software agent 212 may communicate with the server 220 to authenticate the user 202. The software agent 212 may optionally request updated information from the server 220, such as a set of terms 216 representing keywords relevant to the user 202 and an organization of the user 202.

In stage (D), the server 220 may complete the authentication of the user 202. Once it is determined that the received credentials are valid and are authorize access to information from the private database 222, the server 220 may obtain the current set of terms or keywords that are applicable for the user 202 and the user's organization. This may involve extracting information from the private database 222, for example, extracting values from certain columns or fields of the database, such as extracting values representing names of entities or objects. Terms may additionally or alternatively be extracted based on having certain metadata tags or data types associated with them. Other terms, such as abbreviations, nicknames, and other identifiers may also be included. The terms may be filtered based on the access permissions of the user 202, the role of the user 202 (e.g., department, job title, responsibilities, etc.), and other factors.

In stage (E), the server 220 may provide the terms to the client device 210 for storage and/or use by the software agent 212. Terms may be stored in client storage 217, which may comprise non-volatile storage, and/or client memory 219, which may comprise volatile storage, where the client memory 219 may provide faster data access speeds than the client storage 217. The terms can be set by an administrator for the system 200. In some implementations, the set of terms is generated by the server, for example, by pulling terms from portions of a database or other data sources. For example, the server 220 may access database tables that list entity names (e.g., for competitors, suppliers, partner organization, employees, customer contacts, etc.) as well as abbreviations and/or nicknames for them. Based on the identity and role of the user 202, the server 220 may filter the list, e.g., limiting the extracted set of terms to those having information determined to be relevant to the role of the user 202 and/or those for which the user 202 has security permissions to access corresponding data. The set of terms may be further limited to terms for types of entities for which appropriate information card templates have been defined. The filtered list of terms can then be provided to the client device 210. The database may be queried dynamically each time to obtain an up-to-date set of key terms each time a new set of terms 216 is requested.

In some implementations, the user 202 may be able to customize the set of terms, or categories of term types, that are annotated and made interactive to be able to trigger display of an information card. For example, the software agent 212 may provide a user interface allowing a user 202 to edit the list of terms, e.g., to add or remove terms from the set that will be identified and annotated in the future. These changes can be customized for the specific user identity of the user 202 who is logged in and/or for the specific client device 210 used. The user interface may allow edits for individual terms, or for groups or categories of terms. This ability can allow a user to limit the terms that will be annotated to the set that the user is specifically interested in. Similarly, it can expand the set of terms to include terms that may not be directly related to the user's role but still relate to the user's interests.

The terms 216 can be terms other than proper names. For example, for an engineer, the terms 216 may additionally or alternatively include component types, product names, or technical terms. Corresponding information cards may indicate a variety of types of information. For a component, a card might provide specifications, indicate suppliers, provide links to datasheets, identify products that use the component, etc.

In stage (F), the software agent 212 may obtain user interface content from the application 214. For example, the software application 212 obtains text content from the user interface 250 (e.g., as shown in FIG. 2B) or the user interface of application 270 (e.g., as shown in FIG. 2C). This can include the entire content of the rendered page, document, or view, not only the portion that may be currently visible on screen (e.g., due to the current scrolling position).

In stage (G), the software agent 212 may evaluate content of the user interface. For example, this may include comparing text from the user interface 250 with the terms 216 provided by the server 220 and stored at the client device 210, to identify matching terms that should be annotated and for which information cards may be generated.

In some implementations, the software agent 212 and/or the database server 220 may analyze text of the user interface 250 to identify or generate indicators to be displayed. Through analysis of the text of the UI, the software agent 212 and/or the database server 220 can, in real-time, produce indicators and other information on the fly, without the indicators being previously designed by a human author or administrator. For example, if the software agent detects there are multiple instances of an attribute combined with time and geographical dimensions, through interactions with the server 220, the software agent can produce specific aggregations of data for the indicated time and geography and present the information in an information card. To carry out this function, the server 220 may access a semantic graph to enable interpretation of content as it relates to a business or other entity, provide a summary, and link to more details, all of which can be produced dynamically. The semantic graph can indicate, for example, the attributes of an entity and may indicate where to locate data for the attributes from the private database 222.

As an example, from text in a web page or an application, the software agent 212 may identify words in various semantic categories. As an example, along with a keyword "Example Co.," the extension may identify the terms "Q2," "Florida," "subscribers," and "2016" which are not keywords corresponding to specific entities of interest, but nonetheless have a semantic meaning that may be identified by the software agent 212. From these additional terms, the software agent may compose one or more indicators to be requested from the database server 220. For example, the software agent 212 may generate a query that requests a number of subscribers from Example Co. were added in Florida from April to June of 2016. Similarly, the software agent 212 may generate a query requesting a total number of subscribers from the company for the same period and location. In addition, or as an alternative, the software agent 212 may provide the terms with semantic meanings to the database server 220, and the database server 220 can identify appropriate indicators from the terms.

Referring to FIG. 2B, in stage (H), the software agent 212 may generate a query that indicates which terms 216 were identified in the user interface 250 or the user interface of application 270. The query can additionally include other contextual information, such as indications of time, geographical location, or topic that the software agent 212 identified in the content from the user interface 250. The software agent 212 may cause the client device 210 to send the query to the server 220.

In stage (I), the server 220 may identify a semantic meaning for each identified term that the query indicates. As part of identifying a semantic meaning, the server 220 may select a semantic classification from among multiple predetermined semantic categories. The semantic meaning may be generated using the information of the private database 222 and so can be specific to the user 202 and the organization of the user. For example, one company may be a supplier for one organization and a customer of another. Similarly, even within one organization, an individual may be the supervisor of one user but a peer of, or may be supervised by, a different user. Thus, the interpretation of the terms can vary based on the relationships indicated in the private database 222 and can vary from one organization to another, from one user to another, and over the course of time.

In stage (J), the server 220 selects indicators for each identified match to the terms 216. The server 220 may also look up or calculate values for each type of indicator selected. These indicators or types of values to show may be any of multiple types of values. For example, some indicators may be attributes or database field values retrieved directly from a database or other data source. As another example, indicators may be results of aggregation of data from one or more databases, or may be results of processing data with equations, formulas, functions, or models.

The server 220 may select the indicators to be provided using one or more templates that specify which indicators to use in information cards corresponding to different types of entities. For example, a template specifying a first set of indicators may be used for entities classified as suppliers, while a template specifying a different set of indicators may be used for entities classified as customers. As another example, companies, people, locations, and products may each have different templates or sets of indicators predefined, since each may have different attributes or characteristics of interest. Both of these can also be used together. For example, a first set of the indicators may be determined based one classification of an entity (e.g., person, place, object, etc.) while a second set of the indicators may be determined based on a different classification for the entity (e.g., supplier, customer, competitor, etc.) The templates may indicate formatting and layout for information cards as well as the types of indicators that should be provided.

As noted above, for each matching term, the server 220 may determine a semantic classification of the term, e.g., a category or classification of the term and/or identifying an entity that the term refers to (e.g., where the entity may be a particular person, company, object, etc.). The server 220 may also access one or more records from the private database 222. The types of records accessed may vary based on the semantic classification. For example, when the term is a customer name, the data may indicate indicating attributes of the customer (e.g., size, geographical presence, industry, etc.), financial records for the customer (e.g., products purchased, historical and predicted sales amounts, etc.), contact information for representatives of the customer, and so on. When the term is determined to refer to an employee, the accessed records may indicate the department of the employee, the responsibilities of the employee, the supervisor of the employee, the length of time the employee has been with the company, and so on.

For each semantic category, the server 220 may have a number of potential indicators or types of data that can be provided. These indicators may take any appropriate form, such as text, numbers, icons, charts, graphs, images, etc. In some instances, the indicators may represent key performance indicators for an entity referenced by an identified term with respect to the specific organization of the user 202. For each matching term identified in the user interface 250, the server 220 selects a subset of the available indicator or data types to provide in the results 224. This subset may be selected based on various factors. In some implementations, a predefined set of indicators is pre-associated with different semantic classifications. As a result, one set of indicators is provided for customers, another set of indicators is provided for employees, another set of indicators is provided for suppliers, and so on. One way that the server 220 can implement this is to have templates defined for each semantic classification, where the template indicates data types of indicators that are set to be provided for terms having that classification. Each indicator may have one or more references to data within the database, e.g., a column or field type of the private database 222 used to obtain or generate the indicator, as well as corresponding equations for generating the indicator and criteria such as threshold for evaluating the indicator.

In stage (K), the server 220 may provide the values for the selected indicators for each identified term from the query to the client device 210. In the example, the selected indicators include a status of the "Example Co." company with respect to the organization of the user 202, a satisfaction rating indicating how satisfied the company appears to be as a client, a number of open support issues for "Example Co." and contact information for "Example Co." The server provides an indication of each of these indicator types, as well as a value corresponding to each indicator, e.g., a value of "current" for the status indicator, a value of "82" for the satisfaction rating indicator, a value of "3" for the number of support issues, and the phone number "555-5555" for the contact information indicator.

In stage (L), the software agent 212 may cooperate with the application 214 to annotate the identified terms in the user interface 250. For example, the term 252 is annotated in FIG. 2B. This process causes the annotated terms to become interactive. For example, the software agent 212 can register with the application 214 to receive notification of interaction events, such as a mouseover event, click event, tap event, etc. Alternatively, as shown in FIG. 2C, interactive matched terms 276 and 279 may be displayed elsewhere in the user interface of application 270, such as on side bar 273.

In some implementations, when the application 214 is a web browser, the software agent 212 can inject code, such as HTML code and/or JavaScript code, into the content of a web page being browsed to cause annotations to be shown. The injected code may also listen for and respond to events, such as a click, mouseover, tap, voice command, user gesture, or other interaction with annotated terms. When the application 214 is not a web browser, the software agent 212 may use other techniques, such as macros or APIs to cause terms to be annotated and become interactive.

In stage (M), the software agent 212 detects interaction with one of the annotated terms. For example, the user 202 moves a cursor 254 over the annotated term 252. The software agent 212 may detect the interaction by being notified by code that was injected into a web page, such as event handling code that notifies the software agent 212 of the user action. Other techniques may additionally or alternatively be used. For example, the software agent 212 may monitor user input events generally, with information provided by the operating system, for example. The software agent 212 may track the on-screen position of each annotated term, as well as the position of a cursor or user input, and thus detect when the user has interacted with one of the annotated terms.

In stage (N), the software agent 212, in response to the detected interaction, may cause the display of an information card 260, for example, as an overlay or pop-up over the original user interface 250. The information card can include the indicators selected by the server 220 and provided over the network. In some implementations, the information card 260 can be displayed near, e.g., adjacent to or even partially or completely overlapping the annotated term 252.

While various examples discuss annotating terms shown in a web page, the same techniques can be used to annotate and make interactive terms occurring anywhere in a user interface. Thus, terms in applications, documents, toolbars, controls, or any other part of a user interface can be annotated and made interactive to trigger display of an information card corresponding to the term.

As discussed above, the application can be a web browser, and the software agent can be a web browser extension. Nevertheless, the same techniques can be used to provide information cards for other types of applications and with other types of software agents. For example, a native application for word processing, spreadsheet editing, presentation editing, document viewing, etc. can provide an application programming interface (API) through which the content of the application can be provided to a software agent implemented as an application add-on module or extension. The software agent can integrate with or operate alongside a native application to identify keywords and dynamically display information cards as discussed herein.

Figure 3:
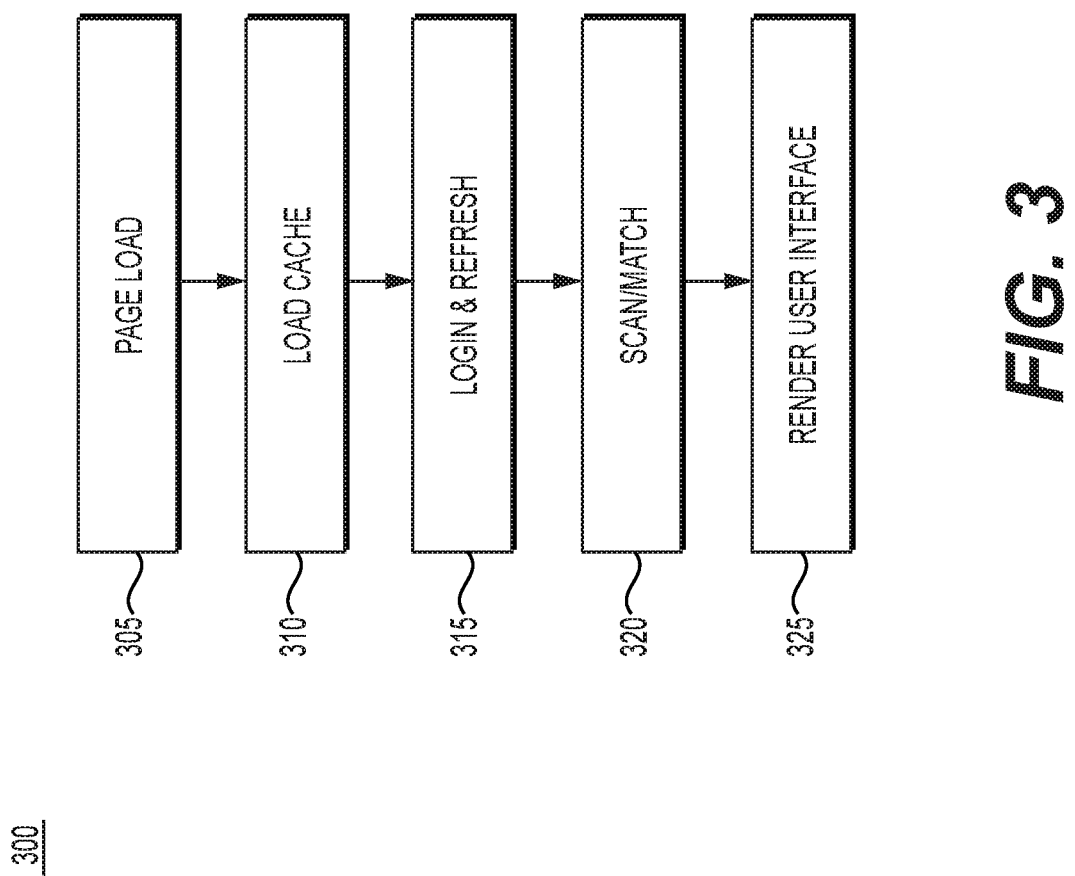
FIG. 3 is a diagram illustrating example techniques of optimizing data flow according to techniques presented herein.

Referring to FIG. 3, special challenges arise when large amounts of data are involved when performing techniques presented herein. For example, if an e-mail program is opened and user interface 150 is displayed on the client device 110, and a very large number of e-mails are displayed, there may be a time lag in matching terms and displaying information cards 160. Further, if the private database 122 has a very large number of terms that need to be downloaded into the client storage 117 and/or client memory 119, the term matching process may be delayed in a manner that negatively affects the user experience. Large numbers of terms may also negatively affect term refresh speeds. Accordingly, data optimization techniques may be implemented so that the user experience is not negatively affected with larger data sets.

At step 305 of method 300, a user interface 150 may be loaded on client device 110, as discussed elsewhere herein. The software agent 112 may subscribe to events happening on and/or corresponding to the user interface 150, such as interface change and/or refresh events. The page load speed may be increased by utilizing progressive web apps. In general, techniques discussed herein may be accelerated by utilizing a cache of data, which may be stored in client memory 119.

At step 310, after the application 114 is opened and/or user interface 150 is displayed, the cache may be loaded into client memory 119, and may be loaded from client storage 117, database server 120, private database 122, etc. For example, if the software agent 112 is executed on the client device for the first time, the cache may be loaded into the client storage 117 and/or client memory 119 from one or more servers across network 140, such as from database server 120. The cached data may comprise terms 116, results 124, indicators, information card set information, term to element ID maps, card definitions, style sheets of card layouts, web source code of viewed cards, and any other data discussed herein. Data may be cached in a manner depending on the container. For example, if the application 114 is a browser, data may be cached in memory in association with the browser and/or the software agent 112. If the application 114 is an app, the data may be cached in memory in association with the app. Cached data may be used to implement techniques discussed herein even when there is a lack of a network connection, which may enable offline mode support.

Cached data, or data stored on the cloud, may further be used to provide access to historical data. Users may view previously viewed information cards, prior information card notifications, and prior user searches for information cards.

Information card history may be sorted and displayed in chronological order. For example, all information cards matched on particular days may be displayed in association with the day, and the days themselves may be displayed in chronological order. Historical information cards may be viewed in collections, such as with "view all," or deleted en masse with "delete all." Information cards may be sorted based on subject, body, sender, recipient, etc., related to any email or calendar entry.

In one technique, elements associated with information card sets may be downloaded serially, and downloaded data may be required to be persisted before the new data is usable for term matching. However, in another technique, to speed up the availability of data for term matching, concurrent downloading may be enabled. In particular, element data associated with information card sets might be downloaded in parallel. Data might not need to be persisted. Matching may be made possible for any data as soon as it is downloaded.

Steps may be taken to reduce memory usage, which may have the effect of reducing the size of the cache. For example, term to element ID maps may be reduced in size. Often terms map to only one element ID, and terms may usually be the same as the element ID, so instead of saving: {"keyword 1": ["keyword 1"], "keyword 2": ["keyword 2", "another element ID"] } the following may be saved: {"keyword 1": 1, "keyword 2": [1, "another element ID"]}. Thus, it may be determined whether the term is the same as the element ID, and if so, only one item of data need be stored, or only a number need be stored indicating that the term and element ID are the same.

Data logging a number of element IDs related to each term might also be made more compact. For example, instead of saving {"keyword 1": 1, "keyword 2": 2} the following may be saved: {"keyword 2": 2}. The number of element IDs related to the term might not be stored if the number is only one. The software might know that if a term is not in the list, this means that the number of element IDs related to it is one.

The information card definition cache may further be removed from memory after the application state is initialized. The information card web code cache may be kept on the client storage 117, and might never be loaded into client memory 119. The web code cache might never be needed for matching information cards, only when a user hovers on a term. Thus, the time to display a card might marginally increase when a user hovers over a matched term, but memory usage will be reduced.

In a browser setting, memory may further be saved by directly putting style sheet links in an HTML iFrame when rendering a full information card. Information cards from the same server may use the same style sheet static link, and thus the browser may only need to download it once. If the browser cache is hit, it may be faster than using style sheets in memory.

At step 315, the user may login and/or the cache may be refreshed. If the software agent 112 and/or application 114 have been executed previously, a copy of the cache may still be stored in the client storage 117 and/or client memory 119 from the prior execution. This step of loading a prior cache may be performed upon login and authentication of the user 102. Authentication of the user 102 may be requested or required if a saved session is still alive from a prior usage. This prior copy of the cache may be loaded into client memory 119, as necessary, and may be updated upon a determination that one or more items of cached data is not up to date. Further, the cache may be refreshed automatically after predetermined time intervals, and/or upon predetermined events. For example, if the user is accessing e-mail via an e-mail client or in a browser, the cache may automatically be refreshed when the user returns to the inbox, or upon user login.

In one technique, a cache manager, which may be a feature of the software agent 112, may load cached data from, for example, a database on client storage 117 to client memory 119. When the cache in the client memory 119 is refreshed or initially downloaded, the refresh process may be performed one information card set at a time. For example, once the "employees" information card set is completed, the user interface 150 may begin to be searched by the software agent 112 for employee names, even though the "company" information card set is not yet fully loaded into cache on the client memory 119.

At step 320, the user interface 150 may be scanned for term matches. Matching may be performed when the user interface is changed in some way. For example, if a user clicks on a new individual e-mail, the contents of the e-mail may be matched against cached data, such as the list of terms. Matching terms may be shown in a side panel, an information card, etc., as discussed elsewhere herein. In one technique, once the cache is fully loaded into memory 119, term matching may begin. If there is a large amount of data in the cache, this load may take several seconds. The load time may be worse if there are a large number of information card sets, and/or a large number of information card elements. As discussed above, the cache refresh process may need to be repeated periodically. Further, new data in the cache may be, at predetermined intervals or upon predetermined events, saved back to a database on the client storage 117. All new data may be saved together.

Term matching may be performed by building regular expressions from the cached data. If term matching does not begin until the cache is fully loaded, and the cached data is large, this may introduce delays and degrade the user experience. To speed up the cache loading of step 310, portions of the cache may be loaded in a predetermined order. For example, a list of information card sets may first be loaded into memory. Next, terms for information card sets may be loaded in a predetermined order, such as in alphabetical or reverse alphabetical order. Further, pieces of terms data may be converted to regular expressions and/or term-element index in the database worker and returned to the main thread. Further, terms matching may begin as soon as a piece of cached data is ready, and might not wait for all of the cached data to be loaded into the client memory 119.

Keyword to element identifier maps, stored in the cache, may make it possible to find information card element identifiers by matching terms. These maps may be kept in the cache to speed up techniques discussed herein. Information card definitions may include card identifier, name, color, template and layout, number of cards, etc.

One technique for scanning the user interface 150 may be to search each information card set, and wait until all matching is finished before updating the user interface. Match results, no matter how many, may be stored in client memory 119. If the user is using, for example, an e-mail application, as the user peruses e-mails, matches may accumulate in client memory 119. If client memory 119 is exhausted, the user experience may slow down dramatically. To speed up the matching process and make the results available to the user as quickly as possible, partial matching may be implemented, such that results are presented on the user interface 150 as soon as they are made. For example, if information card set A and information card set B begin searching for matches at the same time, if B gets the first set of matched terms, B will display the results in the user interface 150 first. Further, a predetermined limit may be set on the number of or total amount of storage given to matches to control memory usage.

At step 325, the user interface may be rendered with updated visual appearances of terms 152, information cards 160, etc., based upon term matching results, as discussed elsewhere herein. Certain techniques may be employed to speed up visual rendering. For example, stylesheet information may be kept in client memory 119 to speed up the rendering of information cards 160.

In one technique, matched terms may cause an HTML or other web language element to be generated in the user interface 150. However, in the case where there are hundreds of matched terms, the hundreds of web language elements may slow or crash the browser or application. To speed up the display, paging may be implemented, where web language elements might be generated only for terms that are visible to the user 102. If a visible term is made invisible, such as when a user moves to a different e-mail, the associated web elements with the now non-visible terms may be deleted. If a user selects "show all", all matched terms may be rendered. A "show more" option may also be selected, which may render a smaller number of matched terms, such as one page at a time.

Figure 4:
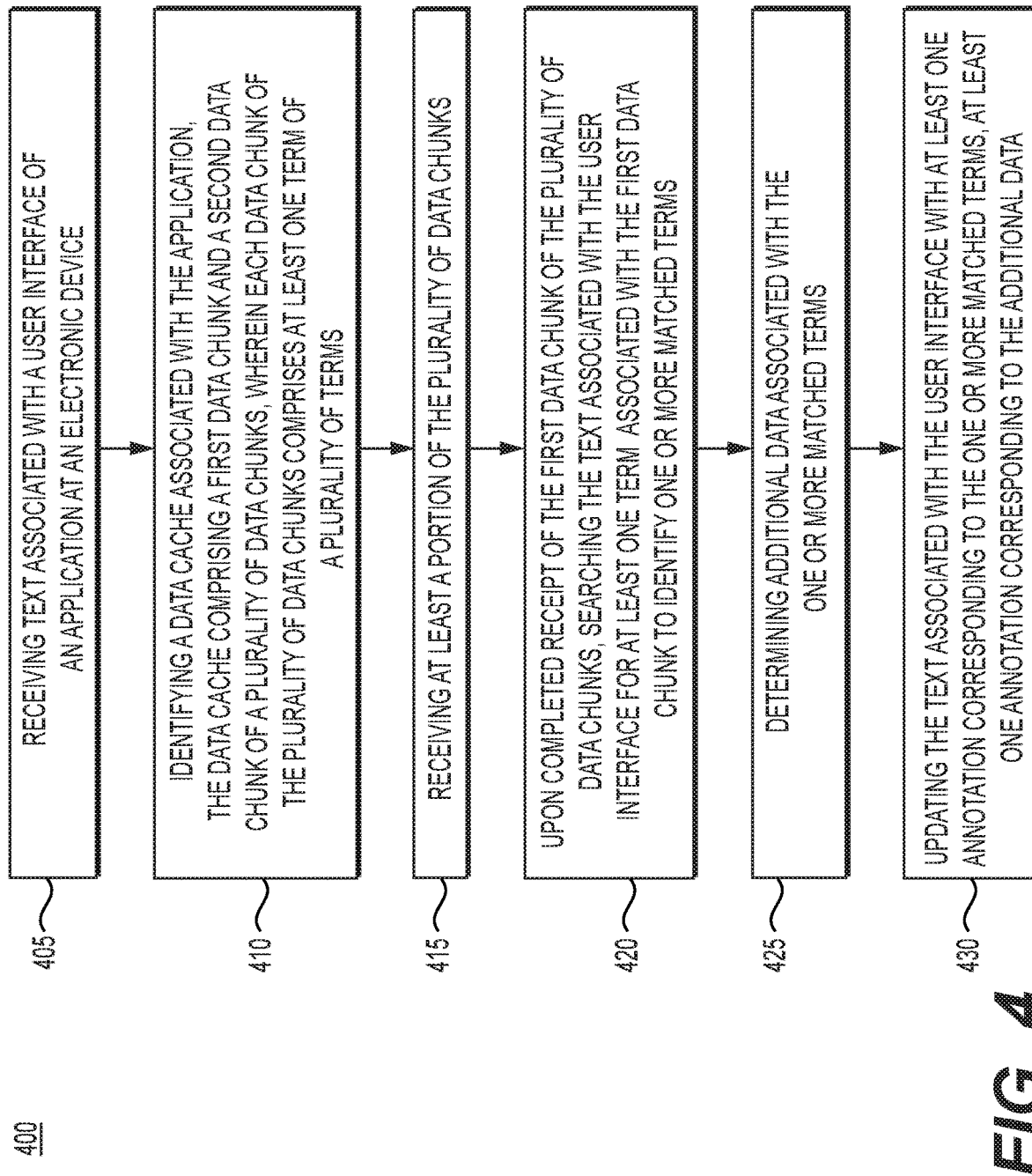
FIG. 4 is a flow chart of an example method of optimizing data flow according to techniques presented herein.

With reference to FIG. 4, an example technique for accelerated contextual delivery of data is disclosed in accordance with techniques discussed herein. At step 405, text associated with a user interface of an application at an electronic device may be received. At step 410, a data cache associated with the application may be identified, the data cache comprising a plurality of data chunks, wherein the plurality of data chunks includes a first data chunk and a second data chunk, and wherein each data chunk of the plurality of data chunks comprises at least one term of a plurality of terms. At step 415, at least a portion of the plurality of data chunks may be received, wherein the at least a portion of the plurality of data chunks received includes the first data chunk and the second data chunk. At step 420, upon completed receipt of the first data chunk of the plurality of data chunks, the text associated with the user interface may be searched for at least one term associated with the first data chunk to identify one or more matched terms. At step 425, additional data may be determined associated with the one or more matched terms, and, at step 430, the text associated with the user interface may be updated with at least one annotation corresponding to the one or more matched terms, the at least one annotation corresponding to the additional data.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A method for accelerating contextual delivery of data, the method comprising:
   receiving text associated with a user interface of an application at an electronic device;
   identifying a data cache associated with the application, the data cache comprising a plurality of data chunks, wherein the plurality of data chunks includes a first data chunk and a second data chunk, and wherein each data chunk of the plurality of data chunks comprises at least one term of a plurality of terms;
   receiving at least a portion of the plurality of data chunks, wherein the at least a portion of the plurality of data chunks received includes the first data chunk and the second data chunk;
   upon completed receipt of the first data chunk of the plurality of data chunks, searching the text associated with the user interface for at least one term associated with the first data chunk to identify one or more matched terms;
   determining additional data associated with the one or more matched terms; and
   updating the text associated with the user interface with at least one annotation corresponding to the one or more matched terms, the at least one annotation corresponding to the additional data.

2. The method of claim 1, wherein searching the text is initiated before the second data chunk is fully received.

3. The method of claim 1, wherein receiving at least a portion of the plurality of data chunks further comprises:
   receiving a list of information card sets, each information card set of the information card sets comprising a category of terms; and
   receiving terms associated with the information card sets in alphabetical or reverse alphabetical order.

4. The method of claim 1, wherein a refresh of the data cache is performed at predetermined time intervals and/or upon predetermined user events.

5. The method of claim 1, wherein the first data chunk corresponds to a first information card set and the second data chunk corresponds to a second information card set, and wherein the searching of the text for the at least one term is performed upon receipt of the first information card set regardless of whether the second information card set has been received.

6. The method of claim 1, wherein identifying a data cache associated the application further comprises:
   determining that a saved session exists, associated with the data cache, from a prior use of the application; and
   upon receiving a user login, loading the data cache associated with the saved session.

7. The method of claim 1, wherein the received first data chunk corresponds to a first information card set and the received second data chunk corresponds to a second information card set, and further comprising:
   upon completed receipt of the first information card set and the second information card set, searching the text associated with the user interface for at least one first term associated with the first information card set and at least one second term associated with the second information card set;

determining at least one matched term associated with the first information card set; and upon determining at least one matched term associated with the first information card set, updating the text associated with the user interface with at least one annotation, wherein searching the text for at least one second term associated with the second information card set is not yet completed.

8. The method of claim 1, wherein data elements associated with the first data chunk and data elements associated with the second data chunk are downloaded concurrently.

9. The method of claim 1, further comprising:

upon receiving a predetermined interaction from a user on the user interface, displaying at least a portion of the additional data on an information card, wherein the information card is rendered according to a style sheet stored in memory across multiple uses of the application by a user.

10. The method of claim 1, further comprising:

upon receiving a predetermined interaction from a user on the user interface, displaying at least a portion of the additional data on an information card, wherein one or more web elements are generated for the additional data, and wherein the one or more web elements are deleted from memory when the information card is no longer visible to a user.

11. A system for accelerating contextual delivery of data comprising:

one or more processors; and one or more machine-readable media storing software including instructions that, when executed by the one or more processors, cause the system to perform operations comprising:

receiving text associated with a user interface of an application at an electronic device;

identifying a data cache associated with the application, the data cache comprising a plurality of data chunks, wherein the plurality of data chunks includes a first data chunk and a second data chunk, and wherein each data chunk of the plurality of data chunks comprises at least one term of a plurality of terms;

receiving at least a portion of the plurality of data chunks, wherein the at least a portion of the plurality of data chunks received includes the first data chunk and the second data chunk;

upon completed receipt of the first data chunk of the plurality of data chunks, searching the text associated with the user interface for at least one term associated with the first data chunk to identify one or more matched terms;

determining additional data associated with the one or more matched terms; and updating the text associated with the user interface with at least one annotation corresponding to the one or more matched terms, the at least one annotation corresponding to the additional data.

12. The system of claim 11, wherein searching the text is initiated before the second data chunk is fully received.

13. The system of claim 11, wherein receiving at least a portion of the plurality of data chunks further comprises:

receiving a list of information card sets, each information card set of the information card sets comprising a category of terms; and receiving terms associated with the information card sets in alphabetical or reverse alphabetical order.

14. The system of claim 11, wherein a refresh of the data cache is performed at predetermined time intervals and/or upon predetermined user events.

15. The system of claim 11, wherein the first data chunk corresponds to a first information card set and the second data chunk corresponds to a second information card set, and wherein the searching of the text for the at least one term is performed upon receipt of the first information card set regardless of whether the second information card set has been received.

16. The system of claim 11, wherein identifying a data cache associated the application further comprises:

determining that a saved session exists, associated with the data cache, from a prior use of the application; and upon receiving a user login, loading the data cache associated with the saved session.

17. The system of claim 11, wherein the received first data chunk corresponds to a first information card set and the received second data chunk corresponds to a second information card set, and further comprising:

upon completed receipt of the first information card set and the second information card set, searching the text associated with the user interface for at least one first term associated with the first information card set and at least one second term associated with the second information card set; and upon determining at least one matched term associated with the first information card set, updating the text associated with the user interface with at least one annotation, wherein searching the text for at least one second term associated with the second information card set is not yet completed.

18. The system of claim 11, further comprising:

upon receiving a predetermined interaction from a user on the user interface, displaying at least a portion of the additional data on an information card, wherein the information card is rendered according to a style sheet stored in memory across multiple uses of the application by a user.

19. The system of claim 11, further comprising:

upon receiving a predetermined interaction from a user on the user interface, displaying at least a portion of the additional data on an information card, wherein one or more web elements are generated for the additional data, and wherein the one or more web elements are deleted from memory when the information card is no longer visible to a user.

20. One or more non-transitory machine-readable media storing instructions that, when executed by one or more processors, cause the performance of operations for accelerating contextual delivery of data comprising:

receiving text associated with a user interface of an application at an electronic device;

identifying a data cache associated with the application, the data cache comprising a plurality of data chunks, wherein the plurality of data chunks includes a first data chunk and a second data chunk, and wherein each data chunk of the plurality of data chunks comprises at least one term of a plurality of terms;

receiving at least a portion of the plurality of data chunks, wherein the at least a portion of the plurality of data chunks received includes the first data chunk and the second data chunk;

upon completed receipt of the first data chunk of the plurality of data chunks, searching the text associated with the user interface for at least one term associated with the first data chunk to identify one or more matched terms;
determining additional data associated with the one or more matched terms; and
updating the text associated with the user interface with at least one annotation corresponding to the one or more matched terms, the at least one annotation corresponding to the additional data.

* * * * *